Patented Feb. 11, 1930

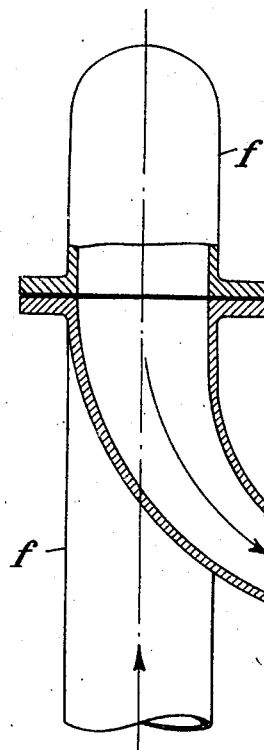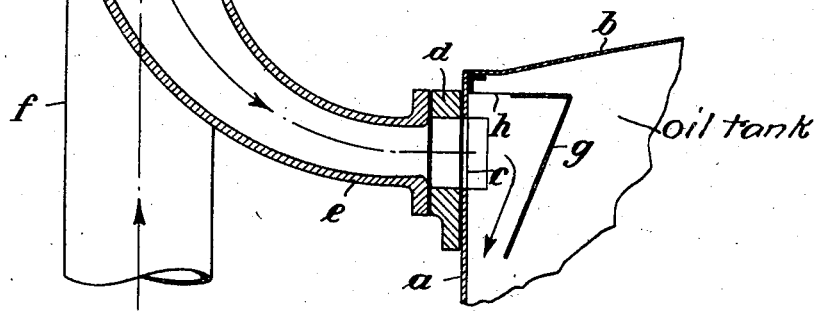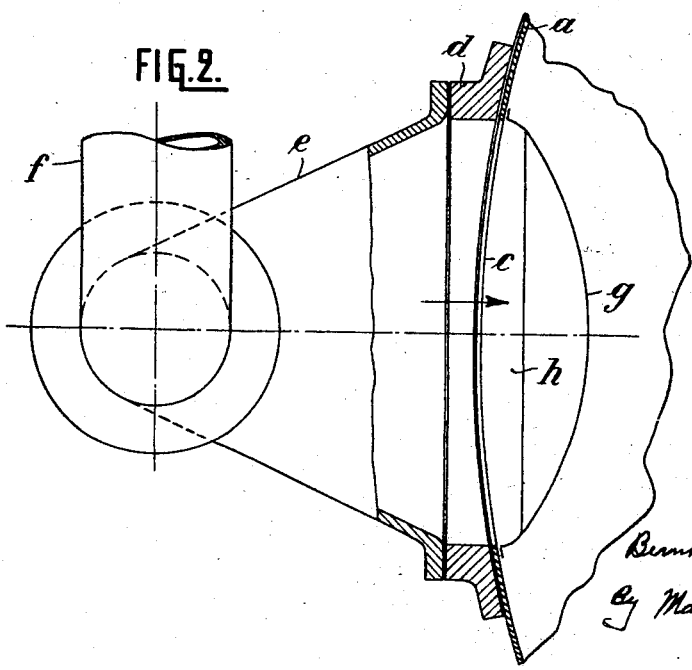

1,746,844

UNITED STATES PATENT OFFICE

BERNHARD REDDEMANN, OF BERLIN-LICHTERFELDE, GERMANY, ASSIGNOR TO PYRENE-MINIMAX CORPORATION, A CORPORATION OF DELAWARE

DEVICE FOR INTRODUCING FIRE FOAM INTO TANKS AND THE LIKE CONTAINING COMBUSTIBLE LIQUIDS

Application filed August 19, 1927, Serial No. 214,016, and in Germany September 1, 1926.

My invention relates to a device for introducing fire foam into tanks and the like containing combustible liquids.

In the structure to be described for the purposes of illustration the foam inlet pipe is flattened at the mouth where it opens into the tank so that it assumes the form of a slit which extends sideways along part of the circumference of the tank only and requires very little space vertically, so that it may be placed close to the upper edge of the tank. In front of the mouth of this foam supply pipe opening into the tank I provide a baffle plate which forces the foam to descend from the inlet along the inner tank wall down to the level of the liquid in the tank. If this baffle plate were absent the foam would enter the tank in an arc so that in case of a comparatively high drop it would be torn apart. In order that the deflecting or baffle plate which may have the shape and configuration of a scoop, for instance, should not be torn off in case of an explosion in the tank, it is in its top provided with an opening the cross-sectional area of which is approximately equal in size with the cross-section of the passage between the wall of the tank and the deflection plate. The explosion pressure may thus pass along the wall of the tank towards the top and through the said opening or space between the wall of the tank and the deflecting or baffle plate without tearing it off the tank.

The drawing affixed hereto illustrates an embodiment of my invention by way of example.

In the drawing are

Fig. 1, a vertical cross-section through part of the upper wall of a tank and the improved foam inlet pipe, and Fig. 2, a sectional plan of Fig. 1.

Referring to the drawing $a$ is a portion of a tank closable by a cover. Close to the upper edge of the tank wall is located the inlet opening $c$ for the fire foam. In front of this opening is provided an intermediate short tubular piece $d$ to which is joined the strongly flattened out mouth $e$ of the fire foam supply pipe $f$.

In the interior of the tank in front of the foam inlet $c$ is provided a deflecting plate $g$ which leads the foam in the direction of the arrow shown in Fig. 1 towards the wall of the tank and which is shaped similar to a scoop. At the top it is provided with an opening $h$ the clear area of which, as already mentioned, corresponds with the cross-sectional area of the passage between the deflecting plate $g$ and the wall of the tank.

Various modifications in the details of constructions may be made without departing from the spirit of my invention and the ambit of the following claims.

I claim as my invention:

1. In a device for introducing fire foam into a tank containing combustible liquids, the combination with a tank having a horizontally elongated orifice in one wall near the top thereof of a foam supply pipe vertically flattened at its mouth and communicating with the horizontally elongated orifice, and a deflector plate located in front of said foam inlet orifice and in position to deflect the foam entering the tank toward the wall of the tank.

2. A device for introducing fire foam into a tank, as defined in the preceding claim, wherein the deflector plate has substantially the shape of an inverted scoop provided with an opening in the upper part adjacent to the wall of the tank, the area of which corresponds substantially with the cross-sectional area between the wall of the tank and the lower edge of said deflecting plate.

I affix my signature.

DR BERNHARD REDDEMANN.